United States Patent [19]

Teran et al.

[11] Patent Number: 5,785,864
[45] Date of Patent: Jul. 28, 1998

[54] APPARATUS FOR THE PURIFICATION OF WATER AND METHOD THEREFOR

[75] Inventors: Alfredo J. Teran, Cape Canaveral; John R. Derrick, Jr., Rockledge; Nidal A. Samad, Merritt Island; Igor A. Vassiliev, Cape Canaveral; Carlos V. Diaz, Merritt Island; W. Todd Willoughby, Cape Canaveral; Louis V. Mangicapra, Merritt Island, all of Fla.

[73] Assignee: AJT & Associates, Inc., Cape Canaveral, Fla.

[21] Appl. No.: 893,465

[22] Filed: Jul. 11, 1997

Related U.S. Application Data

[63] Continuation-in-part of Ser. No. 494,232, Jun. 23, 1995.

[51] Int. Cl.$^6$ .................................................. C02F 1/78
[52] U.S. Cl. .................... 210/739; 210/741; 210/760; 210/96.1; 210/143; 210/192; 210/195.1; 210/199
[58] Field of Search ..................... 210/760, 764, 210/192, 259, 220, 221.2, 195.1, 199, 739, 741, 96.1, 143; 422/186.12, 186.1, 186.07, 24, 28; 261/116, DIG. 42

[56] References Cited

U.S. PATENT DOCUMENTS

| | | | |
|---|---|---|---|
| 1,821,266 | 9/1931 | Lewis | 210/192 |
| 2,043,701 | 6/1936 | Hartman | 210/760 |
| 2,812,861 | 11/1957 | Bickford | 210/192 |
| 3,445,001 | 5/1969 | La Raus | 210/192 |
| 3,448,045 | 6/1969 | Hess et al. | 210/192 |
| 3,660,277 | 5/1972 | McWhirter et al. | 210/760 |
| 3,669,776 | 6/1972 | La Raus | 210/192 |
| 3,680,704 | 8/1972 | Schaefer | 210/170 |
| 3,823,728 | 7/1974 | Burris | 210/760 |
| 3,856,671 | 12/1974 | Lee et al. | 210/192 |
| 3,945,918 | 3/1976 | Kirk | 210/255 |
| 4,007,118 | 2/1977 | Ciambrone | 210/63 |
| 4,043,913 | 8/1977 | Hintermeister | 210/169 |
| 4,049,552 | 9/1977 | Arff | 210/192 |
| 4,053,403 | 10/1977 | Bachhofer et al. | 210/760 |
| 4,098,691 | 7/1978 | Filby | 210/29 |
| 4,104,166 | 8/1978 | LaRaus | 210/195 |
| 4,132,637 | 1/1979 | Key et al. | 210/760 |
| 4,136,027 | 1/1979 | Sakamoto et al. | 210/632 |
| 4,156,652 | 5/1979 | Wiest | 210/205 |
| 4,250,040 | 2/1981 | La Raus | 210/760 |
| 4,252,654 | 2/1981 | Leitzke et al. | 210/760 |
| 4,255,257 | 3/1981 | Greiner et al. | 210/709 |
| 4,256,574 | 3/1981 | Bhargava | 210/614 |
| 4,572,821 | 2/1986 | Brodard et al. | 210/760 |
| 4,597,877 | 7/1986 | Gaia | 210/750 |
| 4,663,089 | 5/1987 | Lowry et al. | 210/221.2 |
| 4,696,739 | 9/1987 | Pedneault | 210/121 |
| 4,780,287 | 10/1988 | Zeff et al. | 422/186.3 |
| 4,798,669 | 1/1989 | Bachhofer et al. | 210/109 |
| 4,834,872 | 5/1989 | Overath | 210/151 |
| 4,883,589 | 11/1989 | Konon | 210/140 |
| 4,898,679 | 2/1990 | Siegel et al. | 210/752 |
| 5,053,140 | 10/1991 | Hurst | 210/704 |
| 5,104,576 | 4/1992 | Ditzler et al. | 210/195.1 |
| 5,116,574 | 5/1992 | Pearson | 422/3 |
| 5,173,257 | 12/1992 | Pearson | 422/3 |

(List continued on next page.)

OTHER PUBLICATIONS

Clearwater Tech, Inc. website page on Ozone Systems, undated.

*Primary Examiner*—Cynthia L. Nessler
*Attorney, Agent, or Firm*—Stein, Schifino & Van Der Wall

[57] ABSTRACT

An efficient, economical, portable, movable, and compact apparatus and method for treating a fluid with ozone comprising multiple pressurized contact columns which are arranged in a hybrid parallel and series column configuration, which utilizes a unique control system and piping arrangement to improve the efficiency of the mass transfer of ozone into the water and increase its solubility by increasing the contact time between the water phase and the gas phase.

13 Claims, 6 Drawing Sheets

U.S. PATENT DOCUMENTS

| | | | |
|---|---|---|---|
| 5,178,755 | 1/1993 | La Crosse | 210/195.1 |
| 5,192,452 | 3/1993 | Mitsui et al. | 210/760 |
| 5,273,664 | 12/1993 | Schulz | 210/759 |
| 5,302,298 | 4/1994 | Leitzke | 210/748 |
| 5,302,356 | 4/1994 | Shadman et al. | 422/186.3 |
| 5,326,469 | 7/1994 | Thompson | 210/192 |
| 5,336,413 | 8/1994 | Van Staveren | 210/650 |
| 5,346,617 | 9/1994 | Costello | 210/192 |
| 5,376,265 | 12/1994 | Szabo | 210/188 |
| 5,376,266 | 12/1994 | Broussard | 210/195 |
| 5,397,480 | 3/1995 | Dickerson | 210/752 |
| 5,458,789 | 10/1995 | Dickerson et al. | 210/750 |
| 5,466,374 | 11/1995 | Bachhofer et al. | 210/610 |
| 5,498,347 | 3/1996 | Richard | 210/739 |
| 5,545,330 | 8/1996 | Ehrlich | 210/703 |

APPARATUS FOR THE PURIFICATION OF WATER AND METHOD THEREFOR

CROSS REFERENCE TO RELATED APPLICATIONS

This application is a continuation-in-part application of Ser. No. 08/494,232 filed Jun. 23, 1995.

BACKGROUND OF THE INVENTION

1. Field of the Invention

The present invention relates to an apparatus and method for the purification of contaminated water. This invention more particularly pertains to an efficient, economical, portable, movable, and compact apparatus and method for treating a fluid with ozone comprising multiple pressurized contact columns which are arranged in a hybrid parallel and series column configuration, which utilizes a unique control system and piping arrangement to improve the efficiency of the mass transfer of ozone into the water and increase its solubility by increasing the contact time between the water phase and the gas phase.

2. Description of the Background Art

Presently there exist many types of water purification devices designed to treat water and waste water with ozone. As general background, there are a number of problems inherent in the use of ozone as a method of water treatment, in particular, ozone gas is very reactive and unstable with a half life in water measured in minutes, it is unstable in a low pressure environment especially if there is too much agitation, heat and ultraviolet light. Large quantities of ozone are difficult to generate at low cost.

Continuing efforts are being made to improve water treatment methods and apparatus. Consider background patents which illustrate, for example, the large number of water purification techniques such as in U.S. Pat. No. 5,178,755, issued to LaCrosse, that discloses a method for treating wastewater, that has been enhanced by treatment with ultra-violet light and with ozone. In this system, a large amount of ozone is generated and inserted at several points in the effluent flow, including insertion in each of the three clarifiers. This system utilizes large quantities of ozone at a relatively high cost and low efficiency.

It is also well known to pass the polluted water through specialized filters. See for instance, U.S. Pat. No. 4,798,669, issued to Bachhofer, et al., that discloses an apparatus for mixing the ozone with water which is then trickled over packing material to entrain the ozone within the water being treated. The water is re-circulated through a return branch and mixes with the incoming contaminant water before it enters the treatment system. Further ozone contact with the contaminants, after filtration of the effluent, is made by inserting recaptured gas into the effluent stream prior to the effluent being treated by a packed column which trickles the effluent over a packing material. As agitation reduces the capability of water to retain ozone, trickling over packing material may be detrimental to the efficient retention of ozone within the effluent for effective contact with contaminants. See additionally, U.S. Pat. No. 5,466,374 to Bachhofer et al.

U.S. Pat. No. 3,945,918, issued to Kirk; U.S. Pat. No. 5,273,664, issued to Schulz and U.S. Pat. No. 5,376,266, issued to Broussard all disclose treatment chambers that are open to one another. In Kirk, the wastewater is passed over a plurality of weirs which agitate the water to aerate it. The gas that is not absorbed within the effluent is collected and reinserted upstream to obtain further contact time. This is complex system requiring numerous tanks and weirs which may denigrate the ozone retention within the wastewater. Schulz uses a plurality of open chambers that are connected by transfer conduits. The ozone is fed into the transfer conduits to entrain and mix the ozone with the water as it passes therethrough. The water then passes into the treatment chambers through a venturi mixing chamber. The free ozone and other gases are vented through a conduit for treatment and disposal. The gases are not reused. In an alternative embodiment, separate vessels are used and the ozone is diffused directly into the water as it flows through the connecting pipes between the vessels. Additionally, Broussard teaches a multi-stage separator vessel utilized as an oil/water separator.

Another grouping of background patents are those which disclose the use of multiple serially connected reactors or stripper columns. By way of example, U.S. Pat. No. 4,696,739 to Pedneault teaches an apparatus which utilizes a plurality of tubular chambers (stripper columns) which are connected in series to strip hydrocarbon contaminants. Pedneault discloses utilizing air flowing counter-currently, optionally containing ozone and optionally heated, through serially connected columns to remove volatile hydrocarbons. U.S. Pat. No. 5,498,347 to Richard teaches use of contact tanks connected in series in which the oxidizing action of ozone is intensified by the introduction of hydrogen peroxide. See also U.S. Pat. Nos. 5,397,480 and 5,458,789 to Dickerson et al.

U.S. Pat. No. 5,336,413 to van Staveren teaches the use of a gas collection device to separate ozone/oxygen from water so that gas does not cavitate and impede the operation of a pump in a water purification apparatus.

In short, water purification is customarily accomplished by columns connected in serial fluid communication with one another. Generally speaking, the injection of ozone into the contaminated water stream deactivates and destroys bacteria and viruses, causes inorganic contaminants to oxidize to less soluble oxides and converts organic components to carbonaceous residues and carbon dioxide. Known apparatus have utilized ozone injectors to introduce ozone in the form of a vast quantity of microscopic bubbles which tend to form about the suspended solid particles and float those particles to the surface of a body of liquid.

However, these known purification apparatuses have drawbacks. Due to the particular arrangement of the various components within, the size of the purification apparatus is often presented as a particular burdensome drawback. Additionally, utilization of columns connected in series may not maximize the absorption of ozone into a contaminated water stream.

Not withstanding the existence of such prior art treatment systems, it remains clear there is a need for a water treatment system which is simple, portable, and efficiently uses the generated ozone in the treatment of the water.

In as much as the art consists of various types of purification apparatus and ozone column configurations, it can be appreciated that there is a continuing need for and interest in improvements to purification systems and their configurations, and in this respect, the present invention addresses these needs and interests.

Therefore, the principal object of this invention is to provide an improvement that overcomes the aforementioned inadequacies of the prior art devices and provides an improvement which is a significant contribution to the advancement of the purification art.

Another object of this invention is to provide a new and improved purification apparatus which has all the advantages and none of the disadvantages of the earlier water purification apparatus.

In response to the realized inadequacies of earlier configurations of water purification apparatus and systems, an apparatus and method for treating a fluid with ozone comprising multiple pressurized contact columns which are arranged in a hybrid parallel and series column configuration, which utilizes a unique control system and piping arrangement to improve the efficiency of the mass transfer of ozone into the water and increase its solubility and contact time between the water phase and the gas phase was developed.

Still a further objective of the present invention is to provide a sensing means to determine and control whether the treated water should be recycled through the water purification process, to the exclusion of fresh untreated water.

Yet another objective of the present invention is improved efficiency of dissolving or forcing a gas (ozone) into the flow of contaminated water using multiple pressurized contact columns.

Still another objective of the present invention is to provide a compact water purification apparatus which may be transportable.

Yet a further objective is to allow for increased contact time of the contaminated water within the columns thereby increasing contaminant removal and purification.

An additional objective is to provide an ozone purification system that is highly reliable in use and easy to operate, monitor and maintain.

Another objective is to provide an ozone purification system which requires little energy consumption.

Even yet another objective is to provide a water purification system which utilizes modular components.

An additional objective is to provide a compact and moveable purification apparatus that may be easily incorporated into any existing water purification system containing other treatment units such as filters (including sand, carbon, or multimedia), coagulation/flocculation basins, sedimentation basins, storage tanks, or any combination thereof.

The foregoing has outlined some of the pertinent objects of the invention. These objects should be construed to be merely illustrative of some of the more prominent features and applications of the intended invention. Many other beneficial results can be obtained by applying the disclosed invention in a different manner or by modifying the invention within the scope of the disclosure. Accordingly, other objects and a more comprehensive understanding of the invention may be obtained by referring to the summary of the invention, and the detailed description of the preferred embodiment in addition to the scope of the invention defined by the claims taken in conjunction with the accompanying drawings.

SUMMARY OF THE INVENTION

The present invention is defined by the appended claims with the specific embodiment shown in the attached drawings. The present invention is directed to an apparatus that satisfies the need for increased ozonation capacity and maximum utilization of available space. The water purification system of the present invention relies on ozone to disinfect and oxidize and decompose contaminants, each particular type of contaminants having a unique residence time within the purification apparatus to obtain the desired purification condition. Unique to the success of the present invention is the efficient and adequate introduction and mass transfer of ozone into water and the utilization of a control system that includes a sensing means and re-circulation control.

A further unique aspect of the present invention is that positive pressure within the contact columns may be continuously controlled and maintained via a water piping arrangement, vent arrangement and vent control valves. The interaction of these elements permits the apparatus of the present invention to obtain optimal dissolution of ozone.

For the purpose of summarizing the invention, the present invention is drawn to a unique apparatus for the purification of contaminated water which comprises multiple pressurized contact columns which are arranged in a hybrid parallel and series column configuration, which utilizes a unique piping orientation to introduce the water stream into the respective columns. The configuration of the preferred embodiment was designed to maximize mass transfer by accounting of the "idiosyncrasies" of the gas to be dissolved (ozone which is a very unstable and reactive gas which can only be produced in low concentrations, approximately 10% by weight) and by improving the means for dissolving the gas into the liquid.

The present invention relates to a water purification apparatus for treatment of water containing contaminants, particularly an apparatus that uses ozone for the elimination of bacteria and viruses, for the oxidation of inorganics, such as iron, magnesia, organically bound heavy metals, cyanide, sulfides, and ammonia, for the oxidation of organics such as dyes, blood, detergents, pesticides, herbicides, and phenols, and for the oxidation of other impurities that cause color, taste, and odor problems. Each contaminant requires a different contact time with ozone to ensure complete oxidation and removal. Utilization of a control system that includes a sensing means and the re-circulation control helps ensure that the necessary contact time parameters are met. The high cost of ozone generation dictates the necessity for its efficient use in the treatment process to control the costs.

Most simply stated, the water treatment system of this invention comprises a plurality of ozone columns, which are connected in a hybrid parallel and series configuration by water and gas pipes; ozone is injected into the contaminated water and treated counter-currently in first and second contact columns, then run counter-current against a fresh ozone which is diffused into a third contact column.

Each ozone contact column is a longitudinally extending hollow column having a closed top-portion, a closed bottom-portion, and an interior space therein. As shown in FIGS. 1 and 4, the contaminated water flows through a conduit, wherein the flow is divided into the two water influent pipes which are in fluid communication with first and second contact columns.

Moreover, the present invention may be configured such that stagnant water flow in the contact columns as a result of ineffective water flow through the columns is virtually eliminated. This problem may be solved by the addition of elbow/s in the water piping.

As the ozone-enriched contaminated water enters the first and second contact columns, a portion of the contaminated water exits the influent pipe via apertures defined in the water influent pipe. Preferably, these apertures utilize specialized fluid flow directing elbows coupled to the water influent pipe. More specifically, a portion of the contaminated water enters the contact columns via an upper directional elbow which is oriented in close proximity to the top-portion of the column. The remaining influent enters contact column through a lower directional elbow oriented near the proximity of the bottom-portion of the second contact column. These directional elbows maximize water flow and reduce or eliminate any stagnant zone within the column.

FIG. 4 further illustrates the preferred embodiment of the column configuration and water piping of the present invention generally described above as comprising first and second contact columns connected in parallel, wherein said first and second contact columns are in serial fluid communication with a third contact column. A conduit, having first (effluent) ends in fluid communication with the interior space of the first contact column and the second contact column respectively, and an second end (influent) in fluid flow communication with the interior space of the third contact column, connects the first and second contact columns serially with the third contact column.

As the water stream exits the first and second contact columns through water effluent ends the water stream from said effluent ends converge into one stream that travels through conduit and enter through the top-portion of the third contact column.

As the water stream flows downward through the third contact column, it flows counter-current to ozone flowing upward via the means of a diffuser. The flow of water from the first and second contact columns enters the top-portion of the third column so that the combined flow is from the top-portion downward, counter to the stream of ozone bubbles being diffused into the bottom-portion of the column. The diffuser is in fluid communication with a second ozone feed line and creates small bubbles of the gases introduced into the third contact column that move upwardly against the downward flow of partially treated contaminated water.

As the water exits the third column, an in-line sensing device determines whether or not the water quality has met preset requirements. If the water quality requirements are not met, a control system will send a signal to a three-way valve to open and thereby recycle the still contaminated water through the present apparatus for infusion with additional ozone and increased contact time, and hence treatment. Once the three-way valve re-circulates the still contaminated water, the introduction of new contaminated water into the water purification apparatus is curtailed. If the water passing by the in-line sensing device meets specified water quality requirements, the water is discharged from the water purification apparatus and additional contaminated water is introduced into the water purification system and apparatus.

The contact columns comprise only a portion of a water purification system which may include sand filters, a contact tank, charcoal filters, and a finishing filter.

The invention accordingly comprises an article of manufacture possessing the features, properties, and the relation of elements which will be exemplified in the articles hereinafter described, and the scope of the invention will be indicated in the claims.

The foregoing has outlined rather broadly, the more pertinent and important features of the present invention. The detailed description of the invention that follows is offered so that the present contribution to the art can be more fully appreciated. Additional features of the invention will be described hereinafter. These form the subject of the claims of the invention. It should be appreciated by those skilled in the art that the conception and the disclosed specific embodiment may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more succinct understanding of the nature and objects of the present invention, reference should be directed to the following detailed description taken in connection with the accompanying drawings in which.

Similar reference characters refer to similar parts throughout the several views of the drawings.

DETAILED DESCRIPTION

Figure 2:
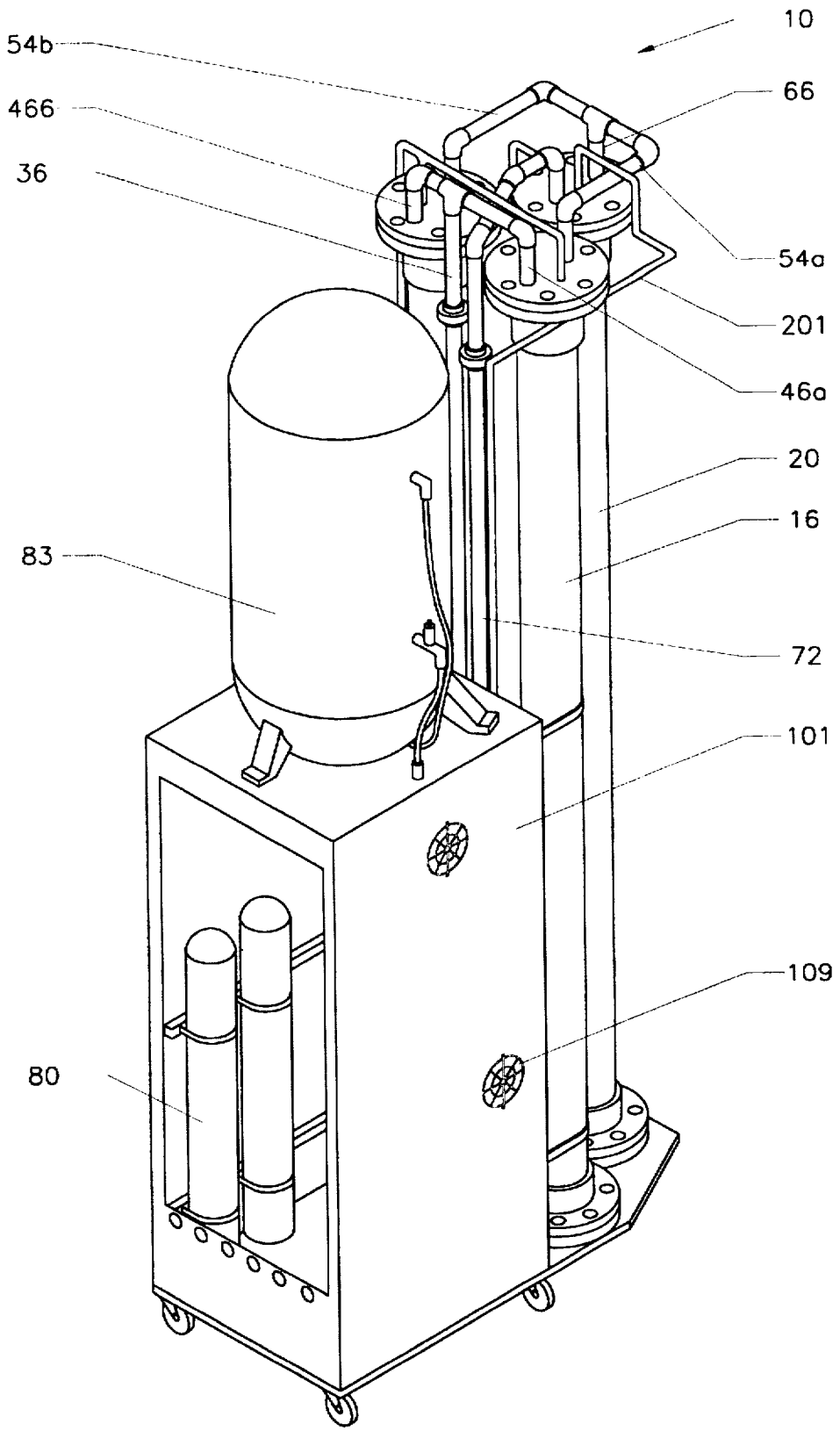
FIG. 2 is a right front perspective view of the water purification apparatus of the present invention.
Figure 3:
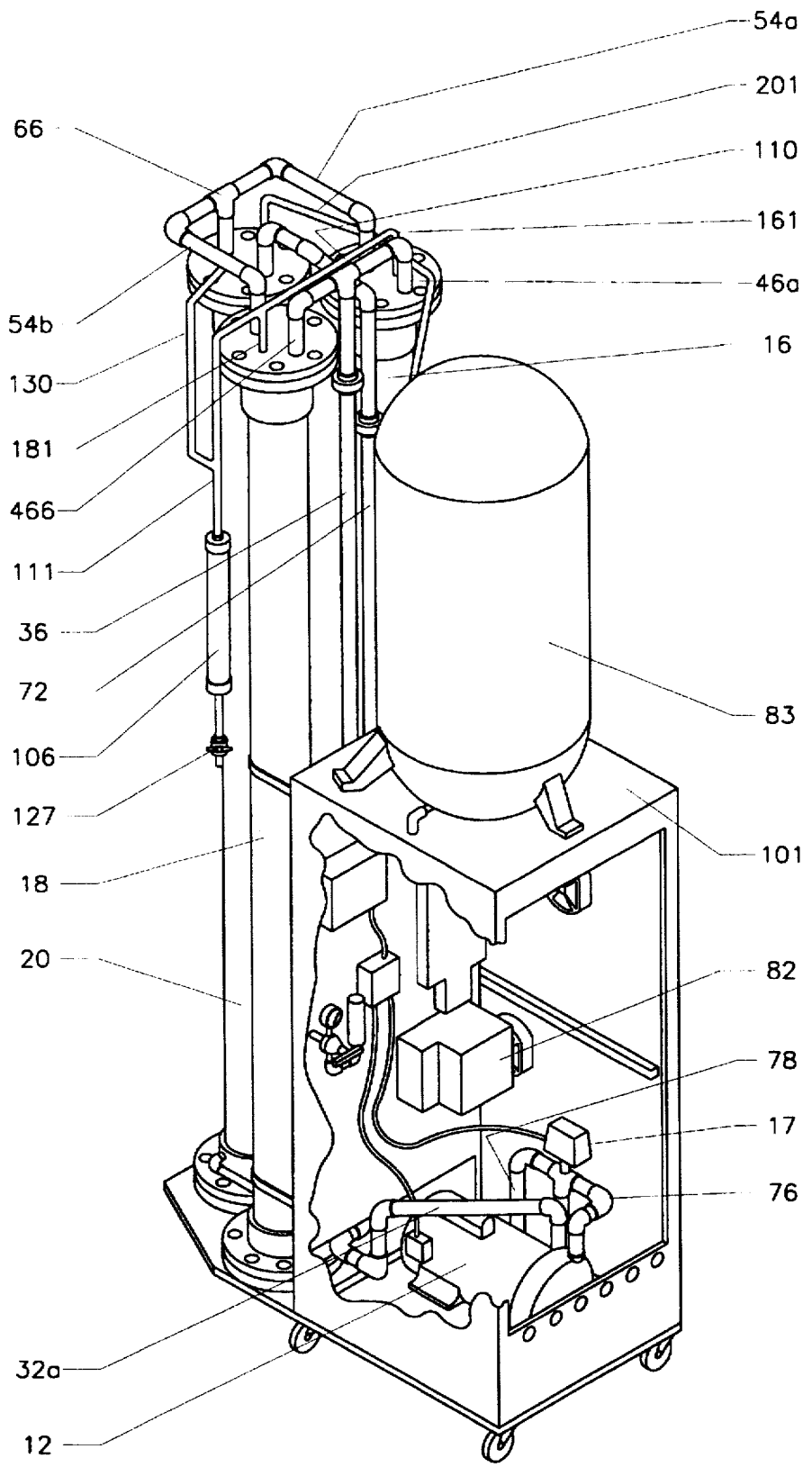
FIG. 3 is a left front perspective view of the water purification apparatus of the present invention.

With reference to the drawings, and in particular FIGS. 2 and 3 thereof, a new and improved water purification system embodying the principles and concepts of the present invention and generally designated by the reference number 10 will be described.

Figure 1:
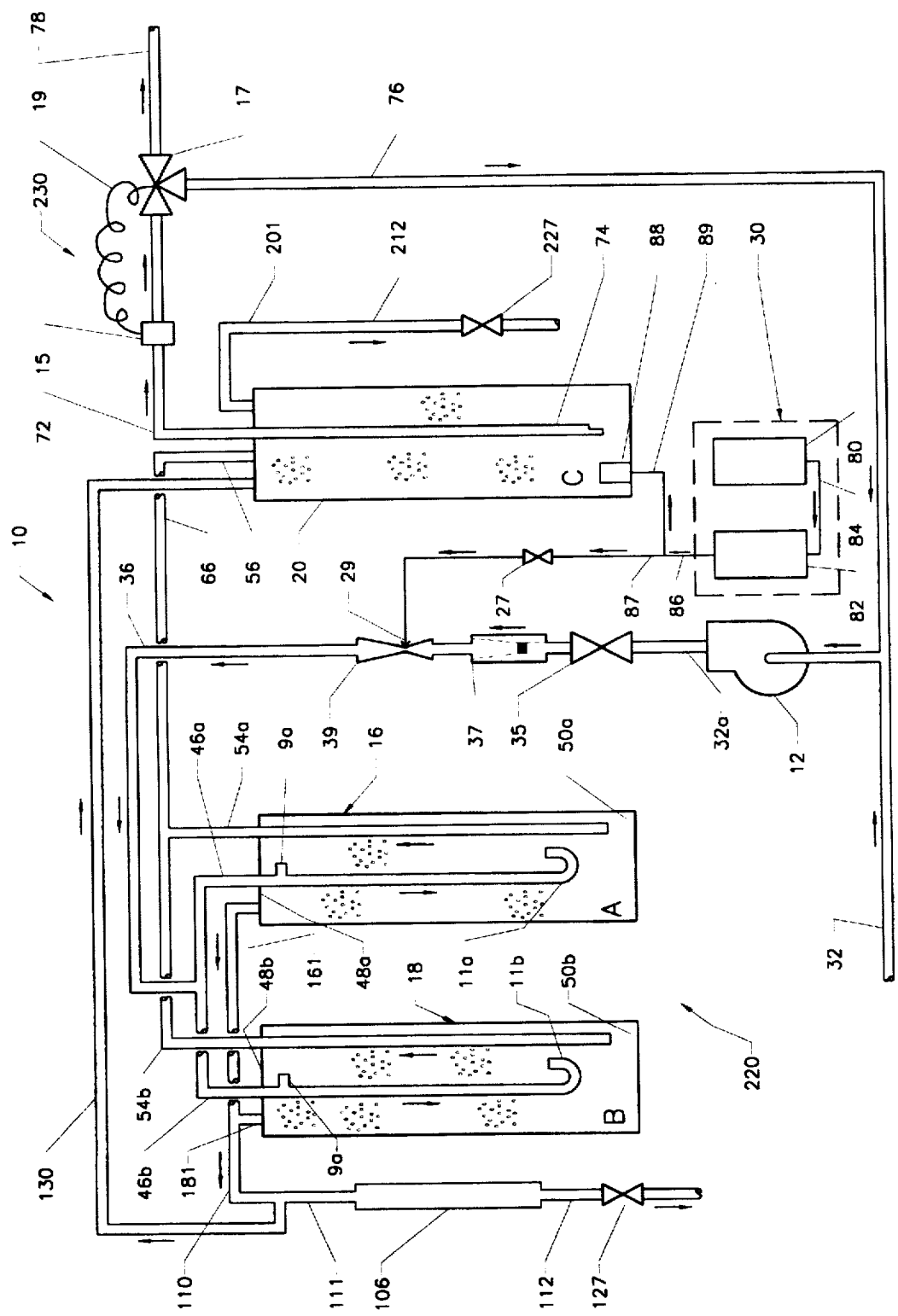
FIG. 1 is a schematic representation of the water and ozone flows through the water purification system of the present invention.

The water purification system 10 of the present invention comprises a plurality of contact columns (16, 18, and 20) which are to be positioned in a contaminated water fluid stream as shown in FIG. 1. It is noted that FIG. 1 is a fluid flow schematic representing the flow of a water stream and ozone through the water purification apparatus of the present invention. In order to facilitate the review of water movement through the water purification apparatus, the orientation and scale of certain components has been slightly distorted. For a more precise representation of the orientation of the components, attention is drawn to the illustrations of FIGS. 2 through 6.

In the present embodiment, first 16 and second 18 contact columns, which define a pair of columns 220, are connected in parallel orientation, said pair of columns are in fluid communication with a last contact column (hereinafter third) 20 which is connected in series orientation with both the first and second contact columns. An inventive aspect of this continuation-in-part patent application is directed to the utilization of a hybrid parallel and series column configuration to maximize the solubility of ozone into the water flow. Specifically, the water purification system of the present invention utilizes the benefits of counter-current flow.

It is well within the skill of one in the art to utilize the teaching of the present application to utilize a plurality of contact columns in parallel orientation, serially connected to additional contact columns.

The term contact column will be utilized herein to refer to the 6–20 foot tall contact columns wherein the contaminated water stream encounters an ozone charged stream, additionally it is known in the art to call these columns contact towers. See for instance U.S. Pat. No. 5,498,436 to Richard, the disclosure of which is incorporated herein by reference. Alternatively, the present invention may have various configurations comprising a variety of different columns to include stripper columns or packed-columns and the like.

Figure 5:
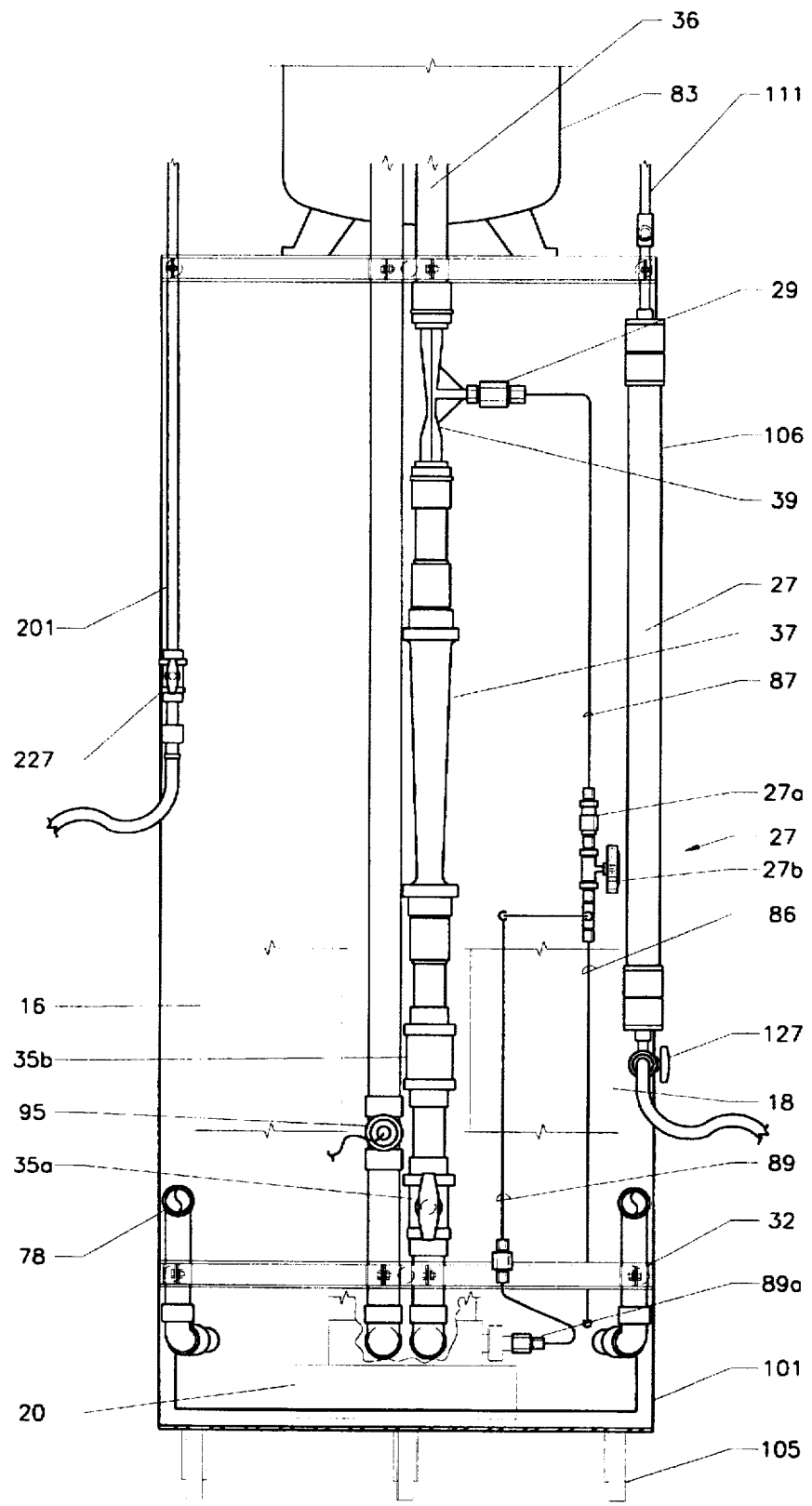
FIG. 5 is a rear view of the water purification apparatus of the present invention, as preferably mounted within a cabinet.
Figure 6:
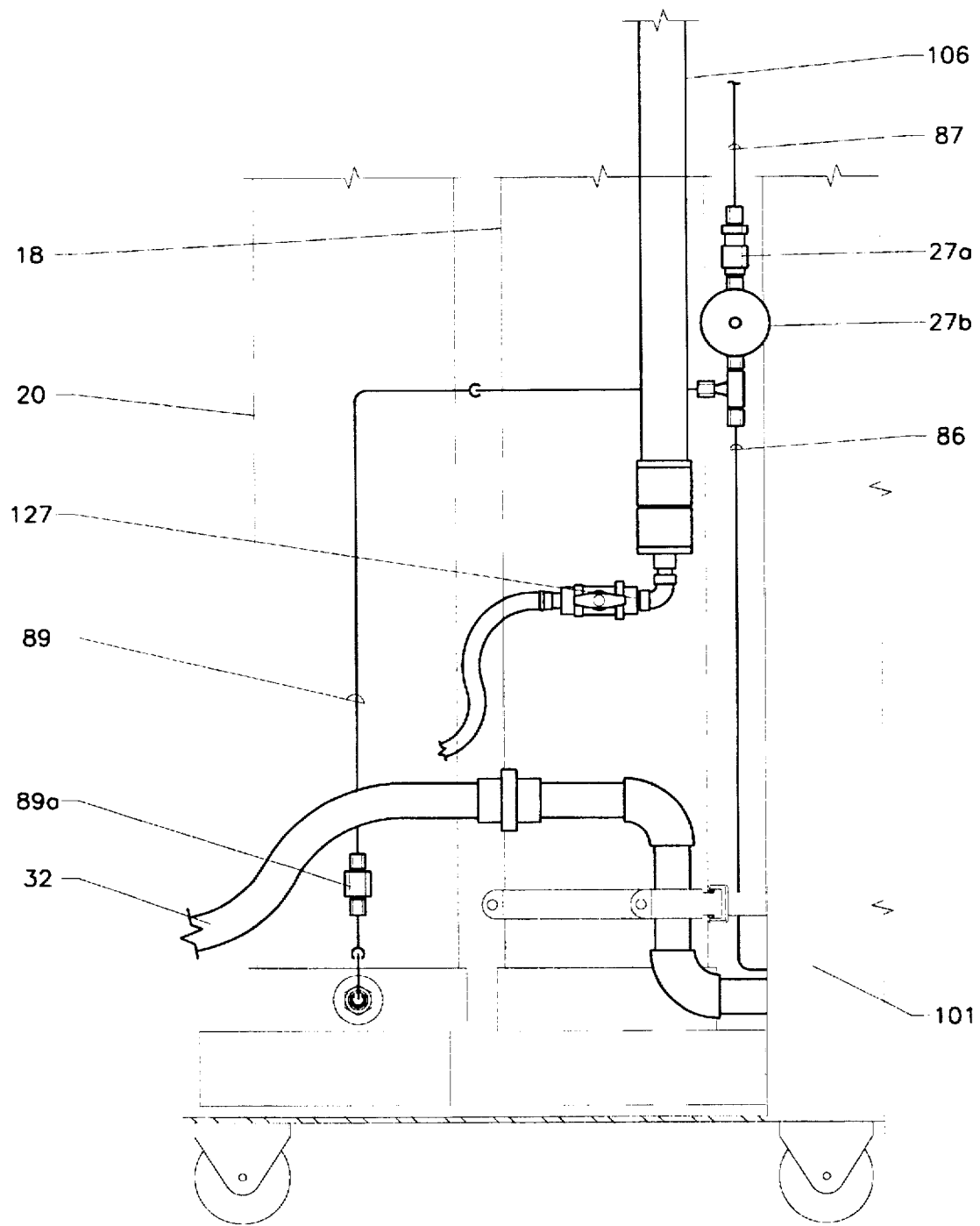
FIG. 6 is a partial left side elevational view of the water purification apparatus of the present invention.

As shown in FIG. 1, the supply pump 12 draws contaminated water from a source such as a lake, river, well, pond, contaminated water storage reservoir, etc. (not shown) through water supply conduits 32 and 32a. The water then passes through a valve or water flow adjustment means 35. Any commercially available water pump may be utilized in the present application, for instance Model #DB 1½ manufactured by Jacuzzi would be suitable. The flow rate of the water may be manually adjusted to the desired rate by this water flow adjustment means 35. As illustrated in FIG. 5, this water flow adjustment means may be a ball valve 35a. Additionally, as illustrated in FIG. 5, a check valve 35b may be utilized to prevent the supply pump 12 from loosing its prime. Alternatively, it is well within the skill of one in the art to convert the water flow adjustment means from manual to automatic operation. The rate of water flow is measured by a water flow metering means 37.

After passing through the water flow metering means 37, the water enters an ozone supplier means 39, which utilizes a venturi injector, where ozone is introduced into the water stream. As illustrated in FIG. 5, the ozone is introduced into the water flow via the ozone supplier means 39 prior to (i.e. upstream) the water flow entering the first and second contact columns (16 and 18).

Alternatively, the water may passes through a sand filter (not shown) before it enters the supply pump 12 for the removal of suspended and abrasives particles. Therefore, the sand filter would be install on the suction side of the supply pump 12. The sand filter may be a standard sand filter whose construction is well known in the art and may be sized on the basis of the quantity and rate of flow as well as the quality of the water that is to be treated.

A contaminated water uptake conduit 36, having a first end in fluid communication with the contaminated water source and a second end in fluid communication with said pair contact columns, connects the outflow from the injector means 39 in fluid communication with the first and second contact columns (16 and 18). The first and second columns are connected in parallel; therefore, the ozone enriched water flows through conduit 36 and splits into two influent conduits 46a and 46b which results in two equal flows that enter the top-portion of columns 16 and 18 simultaneously through the top-portions thereof 48a and 48b.

Figure 4:
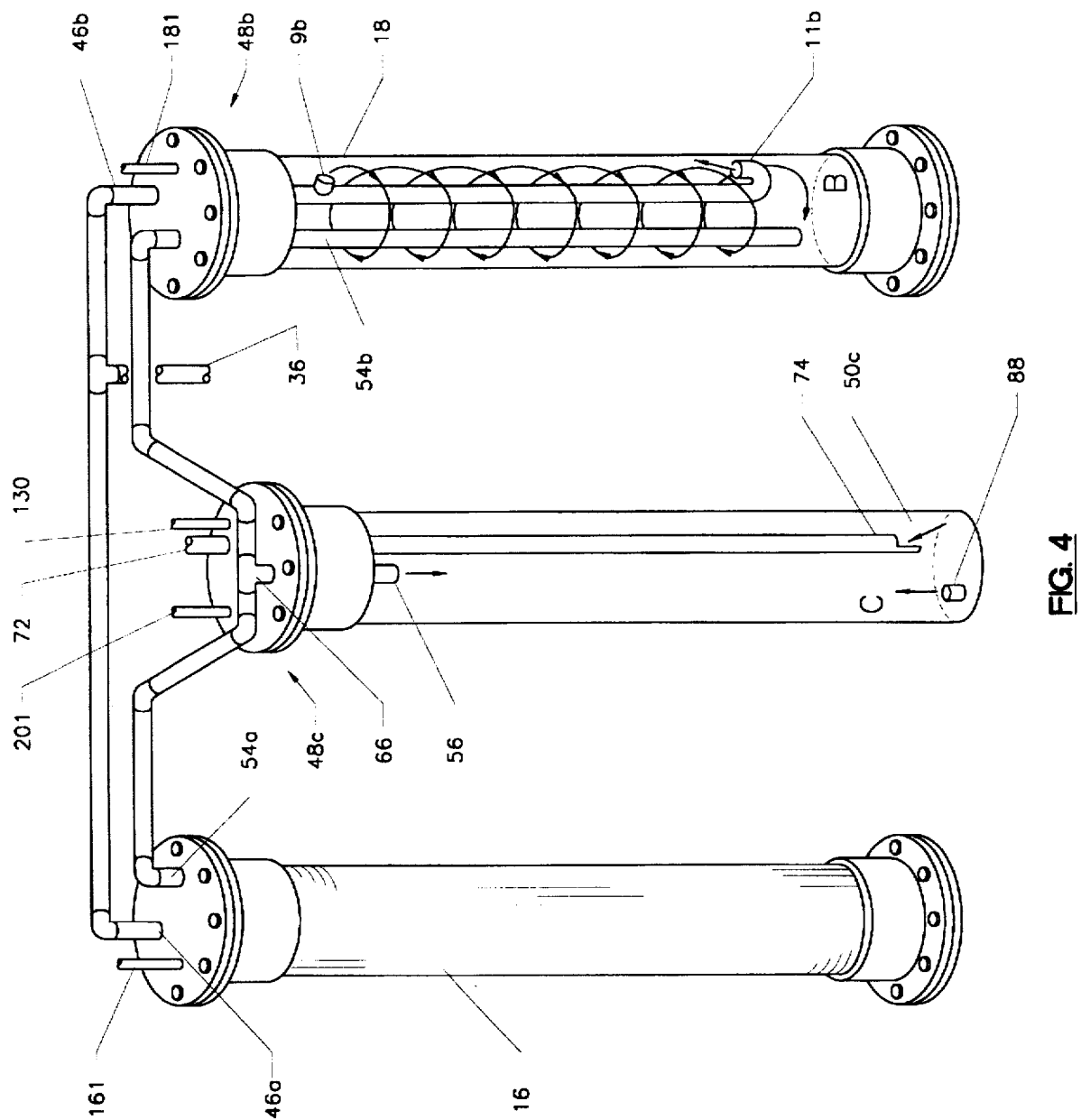
FIG. 4 is an illustration of the preferred embodiment of the column configuration and water piping of the present invention comprising first and second contact columns connected in parallel, wherein said first and second contact columns are serial fluid communication with a third contact column.

As can be seen in FIG. 1, and in greater detail in FIG. 4, in a preferred embodiment there are at least two contact columns that are connected in parallel 16 and 18, this pair of contact columns 220 are serially connected to and in fluid flow communication with a third contact column 20. Each contact column is a longitudinally extending elongate hollow enclosure having a closed top-portion 48, a closed bottom-portion 50, and a gas tight interior space therein. All penetrations of each column are sealed to retain the gas tight integrity. Any suitably sized commercially available contact column may be utilized in the apparatus of the present invention. For example, Model #1016963, manufactured by Harvel. Similarly, any conventional flange and flange gaskets may be employed, for example Model C80272 and C80700 manufactured by Colonial.

As shown in FIGS. 1 and 4, the contaminated water flows through the conduit 36, wherein the flow is divided into the two water influent pipes 46a and 46b. Water influent pipe 46a is in fluid communication with the first contact column 16 while water influent pipe 46b is in fluid communication with of the second contact column 18.

As illustrated in greater detail in FIG. 4, with reference to the second contact column 18 a portion of the contaminated water exits the influent pipe 46b via apertures defined in the water influent pipe. Preferably, these apertures utilize specialized fluid flow directing elbows (9b and 11b) coupled to the water influent pipe. More specifically, a portion of the contaminated water enters the second contact columns 18 via an upper directional elbow 9b which is oriented in close proximity to the top-portion 48b of the column. Preferably, this the upper directional elbow 9b is configured at a 90° angle. The remaining influent enters the second contact column 18 through a lower directional elbow 11b oriented near the proximity of the bottom portion 50b of the second contact column. Preferably, this lower directional elbow 11b is configured at a roughly 45° angle. It is well within the range of skill of one in the art to modify the angles of these elbows or to increase the number of elbows in order to maximize the water flow and reduce or eliminate any stagnant zone within the column.

As illustrated in detail in FIG. 4, the applicant has discovered that the utilization of multiple elbows in the water influent pipes tangentially causes a circular water flow, thereby reducing the incidence of stagnant water in the contact columns. Additionally, laminar flow is prevented and the tangential water flow creates mild turbulence which under the positive pressure of the contact columns increases the dissolution of the ozone. Specifically, since stagnant water within the column reduces the total volume capacity of the column and thereby effects the contact time, by introducing the water through the top elbows 9a and 9b and the bottom elbows 11a and 11b, and by running columns 16 and 18 in parallel, the water flow rate is reduced by half which increases the contact time in the columns. Additionally, by introducing the water counter-current with the ozone flow, the required contact time is more likely to be met and the water is effectively treated utilizing the full benefit of the height of the columns.

Alternatively, multiple directing elbows or apertures in the water influent pipes may be utilized to adjust for and eliminate any stagnant or dead water zone. These elbows may be positioned and oriented along the influent pipe to increase the water flow and distribution of water flowing into the first and second contact columns.

FIG. 4 further illustrates the preferred embodiment of the column configuration and water piping of the present invention generally described above as comprising first and second contact columns connected in parallel, wherein said first and second contact columns are in serial fluid communication with a third contact column. With reference to the second contact column 18, the second end of the water influent pipe 46b passes through the top-portion 48b of the second contact column 18 such that a portion of the contaminated water enters the contact column proximal to the top-portion 48b of the column. Conduit 66, having a divided first end and a second end, wherein the divided first end 54a and 54b (hereinafter effluent) is in fluid communication with the interior space of the first contact column A and the second contact column B respectively, and the second end 56 is in fluid flow communication with the interior space C of the third contact column, connects the first and second contact column serially with the third contact column 20. The open effluent ends (54a and 54b) of the conduit 66 lie within the interior spaces A and B of the first and second contact columns, proximal to the bottom-portions 50a and 50b of the first and second columns. The effluent ends of the conduits 54a and 54b extend upwardly and exit through the top-portion 48a and 48b of the columns. The second end 56 of the conduit 66 passes through the top-portion 48c of the third contact column 20. As the water stream exits the first and second contact columns through water effluent ends 54a and 54b respectively the water stream from effluent ends 54a and 54b converge into one stream that travels through conduit 66 and enters the third contact column at the top-portion 48c thereof.

As the water stream flows downward through the third contact column, it flows counter-current to the ozone flowing upward from a diffuser means 88. The flow of water from the first and second contact columns enters the top-portion of the third column 20 such that the combined water flow entering the third contact column is from the top-portion 48c downward, counter to the stream of ozone bubbles being diffused into the bottom-portion of the column. The diffuser 88 is in fluid communication with a second ozone feed line 89 and creates small bubbles of the gases introduced into the third contact column 20 that move upwardly against the downward flow of partially treated contaminated water. Any well known diffuser of the type similar to model ALR-8-OSS made by Aquatic Eco-System may be used efficiently.

As illustrated in FIG. 1, a pick-up or discharge conduit 72 having a first end 74 in close proximity to the bottom-portion 50c of the third contact column and a second end, connects the interior space C of the third contact column 20 in fluid flow communication with either a contact tank 22 (not shown) or for recycling through the water purification apparatus.

When the water purification apparatus of the present application is in use, a water recycle control means 230 is utilized to determine whether the treated water exiting the third contact column 20 via the discharge conduit 72 should be recycled through the water purification apparatus of the present invention for further treatments. Specifically, an in-line sensing device 15 such as an Oxidation Reduction Potential ("ORP") meter controls an automatic three-way control valve 17 via an electrical conduit 19. Any well known control valve of the type similar to model EAU28 made by Hayward may be utilized. Though the present invention is discussed with specificity towards an ORP meter, further or alternative sensors such as one or a combination of ORP, ozone residual, calorimetric, Total Organic Carbon (TOC) and Chlorine/bromine residual may be substituted.

Depending on the particular contaminants and manner of employment of the water apparatus, if the sensing device meter reading meets the required set-point, an output signal will position the control valve 17 so that the treated water will be discharged from the water purification apparatus 10 and flow to a contact tank 22 (not shown) wherein ozone/water contact time is maximized and the effect of the oxidation monitored. Alternatively, if the water stream exiting the third contact column 20 does not meet predetermined parameters, the three-way control valve 17 routes 100% of the water stream via a recycling conduit 76 back through the water purification system 10. In order to ensure the full purification of the recycled water stream, incoming water from the outside contaminated water source via conduit 32 is preferably curtailed.

More specifically, utilizing an ORP such as Model 3000 manufactured by OzoTech, an operator of the present apparatus will set the set-point requirements for the ORP (for instance 670 millivolts), so long as the ORP of the water is below 670 mV, the water will keep re-circulating through all three columns until the desired parameters are met. As illustrated in FIG. 5, the sensing device partially consists in part of a meter probe 95 disposed within the fluid flow of discharge conduit 72.

The type of sensing device utilized in the apparatus of the present invention and the sterilization or disinfection level desired will dictate the set point of the sensing device. In short, certain parameters or standards for water purification are set (i.e. well-water is considered sterile and safe for drinking when an ORP meter has a set-point of 760 millivolts (mV)) and the partially treated water is re-circulated through the apparatus of the present invention until the sensing meter reading can be favorably compared to the sensing device's set point. Therefore, more then one parameter may be set for the treatment of a water supply (i.e. ORP, ozone concentration, color, Total Organic Carbon ("TOC")) and multiple sensing devices utilized (each having its own meter reading set point). Therefore, as water is discharged from the third contact column, a sensing meter reading will be sent electronically to a controller and depending on the type of sensing meter employed (i.e. ORP, ozone concentration, color, Total Organic Carbon ("TOC")) the controller will compare this reading to the specified set point to ascertain whether a particular parameter has been met.

Alternatively, the valve means controlling water flow through the water purification system may be adjusted such that the recycled water flow constitutes anywhere from 0% to 100% of the total water stream.

As illustrated in FIGS. 1 and 5, the present invention utilizes an ozone supplier means 39 to improve the introduction of an ozone/oxygen mixture into a contaminated water stream thereby initiating the dissolution of the gas into the water prior to the water stream entering the first and second contact columns. Specifically, by use of an injector as the ozone supplier means in the contaminated water steam, a more complete introduction of ozone into the water stream is accomplished. As water flow through an injector it creates a negative pressure at the point where the ozone flow is introduced 29. Therefore, the ozone is actually drawn into the water stream and thereafter into the first and second contact columns.

The ozone utilized in the present device is produced in the ozone system 30. The ozone system 30, that comprises an oxygen generator 80 and an ozone generator 82, is in fluid flow communication with the ozone supplier means 39 and the third contact column 20. The oxygen generator 80 utilized in the present invention may be an Air-Sep Corp. Model AZ-45 or its equivalent. The ozone generator 82 may be a Pacific Technologies ozone generator, model G-24 or an equivalent. The size of the oxygen and ozone generators and hence the size of the purification system depends mostly on the number of different contaminates, the concentration of each contaminates, and the contaminated water flow rate to be treated. Oxygen is generated by the oxygen generator and is passed to the ozone generator 82 via conduit 84. An ozone/oxygen gas mixture from the ozone system 30 flows through an ozone conduit 86, where it divides into first and second ozone feed lines 87 and 89 respectively. The first feed line 87, the ozone feed line for the first and second contact columns, conveys ozone to the ozone supply means 39 while the second feed line 89, the ozone feed line for the third contact column, feeds a diffuser means 88 which is in fluid communication with the third contact column 20. The amount of oxygen/ozone which is drawn in to either the ozone supply means 39 or the third contact column 20 is controlled by means of a ozone valve means 27.

As illustrated in FIGS. 4 and 5, this ozone valve means 27 further comprises a check valve 27a and a needle valve 27b.

Additionally, alternative oxygen sources may be utilizes such as air, an oxygen generator, compressed oxygen, or liquid oxygen. Preferably, the water purification apparatus of the present invention incorporates an oxygen storage tank 83, preferably mounted on top of a cabinet 101. Depending on the oxygen content and other variable factors like gas pressure, gas flow rate, and how efficiently the heat generated by the ozone generator is removed, the ozone content may vary from 1 to 12% in weight.

As illustrated in FIG. 2, the cabinet 101 may be provided with cooling fans 109 to cool the ozone generator.

After the ozone supplier means 39, the water flow is divided equally into two flows (46a and 46b respectively). The inventors have found that the advantage of splitting the water flow is that the splitting of the flow creates a controlled mixing and agitation. Since the water in the water influent pipes is under positive pressure, this controlled mixing and agitation aids in the dissolution of the ozone. Additionally, the splitting of the water stream flow reduces the flow velocity and hence increases the residence time of the water in the columns. This factor, in turn, increases the dissolution of the ozone because the water remains under the additional pressure created by the water head/height for a longer period of time in the columns.

As the partially treated water exits the first and second columns via effluent ends 54a and 54b it combines in conduit 66 and enters through the top-portion of the third contact column. As the water flows into the third column it flows counter-current to the ozone entering the third contact column via the diffuser means 88.

In the present apparatus, mass transfer is critical for the effective purification of contaminated water via ozone. Therefore, to optimize mass transfer a counter current design is utilized in the contact columns. Specifically, in regard to the third contact column 20, as ozone is introduced into the third contact column 20 via the diffuser means 88, the ozone/oxygen infusion flows against the downward velocity of the water entering the top-portion 48c of the third contact column 20. This counter-current increases the contact time and therefore the solubility of the ozone in the water stream. The introduction of ozone into the third contact column by means of a diffuser means 88 helps ensure that there is a high ozone concentration to aid in the final elimination of contaminants from the water stream.

Each of the contact columns incorporates a relief vent at the top-most portion thereof. These relief lines or vents (161, 181 and 201 respectively) prevent the un-dissolved oxygen and ozone from creating back-pressure on the pump, injector and diffusers and potentially decreasing the water level in the columns. More particularly, these relief lines prevent excessive pressure (herein considered greater than 15 psig) from building within the columns that would inhibit the introduction of ozone, especially in the third contact column 20.

As best evidenced in FIG. 3, the relief lines from the first 161 and second 181 contact columns, which are in parallel configuration, combine in a single conduit 110 and are in fluid communication with the gas/liquid separator 106 (hereinafter separator), via conduit 111. The water level of the gas/liquid separator 106 is adjusted via a relief valve means 127. The separator 106 serves to separate the gases from any fluids that may be carried over from the first 16 and second 18 contact columns. The separator further has a waste line attached thereto (not shown).

The gas from the gas/liquid separator is introduced at the top-portion of the third contact column 20 via off-gas conduit 130. The utilization of a separator in the present invention is advantageous in that it forms a barrier for the off-gas from being discharged with the carried over water. The off-gas may still contain unreacted and undecomposed ozone. For that reason, it is beneficial for the off-gas to be returned to the third contact column 20 via the off-gas conduit 130.

On the other hand, since the off-gas from the first and second contact columns (the parallel columns 16 and 18) may not contain any residual ozone because it may have completely reacted and/or decomposed, a portion of the ozone generated via the ozone system 30 is diffused directly into the third contact column via the diffuser means 88.

As water flows through the ozone supplier means 39 and through conduit 36, it is mixed with ozone. As the water/ozone gas mixture exits the upper and lower fluid flow directing elbow 9 and 11 within the first and second contact columns, the ozone gas travels upwards through the column towards the relief lines (161 or 181) while the water flows downward through the contact columns toward the bottom portion where it is taken up via the first effluent end of conduit 66 and flows toward the third contact column 20. Therefore, since the gas and water flow contrary to one another (i.e. counter), contaminated water is treated counter-current in the first and second contact columns.

A relief vent 201 connected in fluid communication with the third contact column 20, is separately controlled and discharged by means of a valve mechanism 227 and conduit 212. As evidenced in FIGS. 2–3 and 5–6, the water purification apparatus of the present invention is designed such that it may be partially housed within cabinet 101. Preferably, this cabinet may be mounted on wheels 105 to improve the transportability of the apparatus. Any well known cabinet of the type similar to model A723024FS made by Hoffman may be used efficiently. The apparatus of the present invention effectively utilizes ozone for the purification of contaminated water yet, notwithstanding the height of the contact columns, remains portable.

Furthermore, it should be understood that the water purification apparatus of the present invention is designed to utilize modular components to facilitate maintenance and repair.

The water purification apparatus of the present invention may be incorporated into any contaminated water treatment system having various configurations comprising a variety of different peripheral elements such as an activated carbon filter and a finishing filter, etc. Specifically, the water purification apparatus of the present application may replace an apparatus, utilizing multiple ozonation columns which are oriented in series, within a contaminated water stream and additionally incorporate an contact tank, an activated carbon filter, a finishing filter and a storage tank (not shown).

Additionally, packing material may be utilized in the contact columns. The columns, 16, 18 and 20 may contain packing material (not shown) filling the lower ¼ to ⅓ of the column. The utilization of packing material in the respective columns aids in mass transfer and therefore, in a system or application where there is a height and/or residence restriction, a packing material may be utilized.

The water purification system 10 is designed primarily as a once through system with a go or no-go determination being made after treatment by a sensing means disposed within the fluid flow of conduit 72 as the purified water exits the third contact column. Therefore, the quality and the amount (i.e. flow rate) of the water being treated are the primary factor in determining the sizes of the components within the water purification system 10. For example, high levels of biochemical oxygen demand (BOD) will dictate the need for a higher capacity ozone generator and/or longer contact time within the contact columns 16, 18 and 20 and/or the contact tank 22 (not shown). Longer contact times may be obtained by making the contact columns taller or by increasing the number of columns. The preferred height when using a plurality of contact columns is between six and twenty feet with a diameter of approximately 10 to 24 inches; however, columns of different height and diameter and even a contact tank may be used depending upon the circumstances. Often shorter columns must be used in order to fit the purification system 10 within a predetermined space. Shorter columns also permit purification systems to be portable. In addition, use of multiple ozone columns increases the efficiency of ozone and oxygen absorption into the contaminated water, which is necessary for effective contact between the ozone and/or oxygen and the biological or chemical contaminants in order to oxidize and thus destroy the contaminants or permit their removal from the water.

All the pipes, conduits, columns, and storage tanks are preferably constructed from PVC or stainless steel as ozone does not interact with these materials, but ozone will corrode almost any other material. Those parts of the system that are upstream from the ozone supplier means 39, for example pump 12, or are downstream from the activated carbon filter 24 (not shown), for example, the storage tank, may be constructed from other materials if it is desirable.

Having thus set forth a preferred construction for the water purification system 10 of this invention, it is to be remembered that this is but a preferred embodiment. Attention is now invited to a description of the method of operation of the water purification system 10, using the embodiment of the apparatus illustrated in FIG. 1. The method of operation would be very similar for any system utilizing three or more contact columns connected in a hybrid parallel/series configuration.

As mentioned previously, the water to be treated is first analyzed to determine its characteristics, including the mineral content, chemical content, solids, bacteria, and viral contamination. Then, as an example, a $BOD_5$ is determined in order to calculate the amount of oxygen and ozone required and the contact time required. From this information, the various components are sized so that the water purification system may be operated, as a once through system, as the quality of the contaminated water to be treated that is obtained from a large source of water will normally be generally consistent. Once a system has been sized and put in place, operation may begin to obtain uncontaminated water.

For example, for a purification system 10 purifying water containing bacteria, viruses, algae, and organic compounds, having a 100 mg/l $BOD_5$ and 250 mg/l of suspended solids, will define a particular embodiment of the purification system 10 comprising first, second and third contact columns being 8 inches in diameter and 10 feet in height. However, the purification system 10 will be sized according to the quality and the amount of the water to be treated. Sand filters, activated carbon filters, and finishing filters are well known components that can be sized by those skilled in the art. Additionally, the required contact time and specific size of the contact columns may be readily ascertained by one skilled in the art.

In operation or the purification system 10, valve 35 is opened and supply pump 12 is turned on. Initially, as the system's operation is begun, it may be set up for re-circulation of the contaminated water. Contaminated water is drawn from its source and the desired level of treatment is set on the sensing device 15. Generally, the set point is higher than the actual meter's reading of the fresh contaminated water, and therefore, valve 17 is in the re-circulation position. The contaminated water moves tangentially downwardly through the pair of contact columns connected in parallel, the first and second columns 16 and 18, under pressure supplied by the supply pump 12, gravity, and the water head. The water under pressure, then moves into the first end of the conduit 66 and through influent conduit 56 into the third contact column 20. A pressure of approximately 15 psig is obtained in the first and second columns and 6–12 psig is obtained in the third contact column. As the water flow in the purification system is established, the oxygen and the ozone generators are turned on, and the ozone flow in conduits 87 and 89 are adjusted via valve 27. In order to prevent excess pressure build up in columns 16 and 18, the amount of gas pocket on top of the columns is controlled by a relief valve 127. Likewise, the amount of pressure build up in contact column 20 is adjusted by relief valve means 227.

A unique aspect of the present invention is that the positive pressure within the contact columns is continuously controlled and maintained via the water piping arrangement, relief line and vent arrangement and vent control valves. The interaction of these elements permits the apparatus of the present invention to obtain optimal dissolution of ozone.

A portion of the ozone-oxygen gas mixture is inserted in the third contact column 20 by the diffuser 88 and the bubbles rise toward the top-portion 48c of the last ozone column 20 against the flow of the contaminated water. By diffusing the ozone-oxygen gases under pressure, a greater amount of gases are taken into solution to make more efficient contact with the contaminants in the water.

In the first and second contact columns, partial purification of the contaminated water by injection of ozone into the water steam by an injector in the ozone supplier means 39 and contact within the columns is accomplished. The off-gas that may or may not contain unused ozone gas along with other gases which are byproducts of the interaction of the ozone gas with the contaminants in the water are separated from any carried over water from columns 16 and 18 in the liquid/gases separator 106, and moves through the off-gas pipe 130 to the third contact column 20 where the gases are introduced into the water column. By re-diffusing off-gas into the third column 20, the utilization of the produced ozone from the ozone generator 82 is maximized. In addition, small bubbles of fresh ozone/oxygen mixture are inserted under pressure through the diffuser 88 to increase the amount of ozone and oxygen that go into solution providing improved treatment of the contaminated water and more efficient usage of the ozone and oxygen.

When the treated water meets the set-point, it is discharge through conduit 78 and passes through a granulated carbon filter (not shown), through a finishing filter (not shown) to ensure purified water which is then sent to a storage tank (not shown) or may be piped directly to an end-user.

The present disclosure includes that contained in the appended claims, as well as that of the foregoing description. Although this invention has been described in its preferred form with a certain degree of particularity, it should be understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A method of purifying water comprising the steps of:
   a. obtaining an apparatus for treatment of contaminated water, comprising:
      a plurality of longitudinally extending contact columns, each of said contact columns having a closed top-portion, a closed bottom-portion, and an interior space therein, wherein first and second contact columns of said plurality of contact columns are joined together in parallel to define a pair of contact columns, wherein said pair of contact columns are connected in series to a third contact column;
      a contaminated water source connected in fluid flow communication with said pair of contact columns via an uptake conduit having a first end and a split second end, wherein said split second end further comprises two influent pipes, each of said pair of contact columns having one of said influent pipes extending therein, whereby equal flows of ozone enriched contaminated water are introduced through said top portions of said first and second contact columns, wherein each of said influent pipes of said pair of contact columns further comprises a plurality of apertures defined in each of said influent pipes whereby the contaminated water is introduced into said interior space of said pair of contact columns, wherein upper and lower directing elbows are coupled to said apertures;
      a water conduit connecting each said interior space of said pair of said contact columns in series with said third contact column, said water conduit having a divided first end in close proximity to said bottom-portion of said pair of contact columns and a second end in fluid flow communication with said interior space of said third contact column whereby the contaminated water enters said first end of said water conduit from a portion of said interior space of said pair of contact columns and said second end of said water conduit is connected to said third contact column whereby the contaminated water enters the interior space of said third contact column proximal to said top-portion thereof;
      an off-gas conduit connecting each said interior space of said pair of contact columns in with said third contact column, said off-gas conduit having a first end and a second end, said first end of said off-gas pipe in communication with said pair of contact columns and a second end in fluid flow communication with said interior space of said third contact column whereby gas enters the interior space of said third contact column proximal to said top-portion thereof;
      a water flow adjustment means disposed between the contaminated water source and said pair of contact columns whereby the flow rate of the water may be adjusted;
      a ozone supplier means disposed between the contaminated water source and said pair of contact columns whereby ozone may be introduced into the contaminated water flow;
      an ozone source connected in fluid flow communication with said pair of contact columns via said ozone supplier means and said third contact column via an ozone feed line;
      a means for pressurizing each of said contact columns to a positive pressure; and
      a control means for determining whether the contaminated water is to be recycled through the water purification apparatus;
      whereby said gas and water flow counter-current to each other in said plurality of pressurized contact columns such that ozone is dissolved in said water;
   b. establishing a set point for the control means;
   c. introducing contaminated water into water purification apparatus;
   d. adjusting the flow rate of the contaminated water via said water flow adjustment means;
   e. introducing ozone into the contaminated water stream via said ozone supplier means;
   f. flowing said ozone enriched water through said pair of contact columns wherein the gas and water flow counter-current to one another;
   g. directing the contaminated water through said pair of contact columns to the third contact column;
   h. diffusing and ozone and oxygen enriched gas into the third contact column against the flow of contaminated water;
   i. collecting the unused ozone and oxygen enriched gas from said pair of contact columns;
   j. diffusing said collected unused gas into the third contact column to increase the utilization of ozone gas;
   k. flowing the treated contaminated water by a control means to determine whether said contaminated water is to be recycled through the water purification system.

2. A water purification apparatus for treatment of contaminated water, said water purification apparatus comprising in combination:
   a plurality of longitudinally extending contact columns, each of said contact columns having a closed top-portion, a closed bottom-portion, and an interior space therein, wherein first and second contact columns of said plurality of contact columns are joined together in parallel to define a pair of contact columns, wherein said pair of contact columns are connected in series to a third contact column;
   a contaminated water source connected in fluid flow communication with said pair of contact columns via an uptake a conduit having a first end and a split second end, wherein said split second end further comprises two influent pipes, each of said contact columns having one of said influent pipes extending therein, wherein each of said influent pipes of said pair of contact columns further comprises a plurality of apertures defined in each of said influent pipes whereby the contaminated water is introduced into said interior space of said pair of contact columns, wherein upper and lower directing elbows are coupled to said apertures;
   a water flow adjustment means disposed between the contaminated water source and said pair of contact columns whereby the flow rate of the water may be adjusted;
   a ozone supplier means disposed between the contaminated water source and said pair of contact columns whereby ozone may be introduced into the contaminated water flow;
   an ozone source connected in fluid flow communication with said pair of contact columns via said ozone supplier means and said third contact column via an ozone feed line;
   a means for pressurizing each of said contact columns to a positive pressure; and
   a control means for determining whether the contaminated water is to be recycled through the water purification apparatus;

whereby said gas and water flow counter-current to each other in said plurality of pressurized contact columns such that ozone is dissolved in said water.

3. A water purification apparatus for treatment of contaminated water, said water purification apparatus comprising in combination:

a plurality of longitudinally extending contact columns, each of said contact columns having a closed top-portion, a closed bottom-portion, and an interior space therein, wherein first and second contact columns of said plurality of contact columns are joined together in parallel to define a pair of contact columns, wherein said pair of contact columns are connected in series to a third contact column;

a contaminated water source connected in fluid flow communication with said pair of contact columns via an uptake conduit having a first end and a split second end, wherein said split second end further comprises two influent pipes, each of said pair of contact columns having one of said influent pipes extending therein, whereby equal flows of ozone enriched contaminated water are introduced through said top portions of said first and second contact columns, wherein each of said influent pipes of said pair of contact columns further comprises a plurality of apertures defined in each of said influent pipes whereby the contaminated water is introduced into said interior space of said pair of contact columns, wherein upper and lower directing elbows are coupled to said apertures;

a water conduit connecting each said interior space of said pair of said contact columns in series with said third contact column, said water conduit having a divided first end in close proximity to said bottom-portion of said pair of contact columns and a second end in fluid flow communication with said interior space of said third contact column whereby the contaminated water enters said first end of said water conduit from a portion of said interior space of said pair of contact columns and said second end of said water conduit is connected to said third contact column whereby the contaminated water enters the interior space of said third contact column proximal to said top-portion thereof;

an off-gas conduit connecting each said interior space of said pair of contact columns in with said third contact column, said off-gas conduit having a first end and a second end, said first end of said off-gas pipe in communication with said pair of contact columns and a second end in fluid flow communication with said interior space of said third contact column whereby gas enters the interior space of said third contact column proximal to said top-portion thereof;

a water flow adjustment means disposed between the contaminated water source and said pair of contact columns whereby the flow rate of the water may be adjusted;

a ozone supplier means disposed between the contaminated water source and said pair of contact columns whereby ozone may be introduced into the contaminated water flow;

an ozone source connected in fluid flow communication with said pair of contact columns via said ozone supplier means and said third contact column via an ozone feed line;

a means for pressurizing each of said contact columns to a positive pressure; and a control means for determining whether the contaminated water is to be recycled through the water purification apparatus;

whereby said gas and water flow counter-current to each other in said plurality of pressurized contact columns such that ozone is dissolved in said water.

4. The water purification apparatus as in claim 3 whereby a portion of the contaminated water enters said interior of said pair of contact columns via said upper fluid flow directional elbow which is oriented in close proximity to the top-portion of said contact column and a portion of said contaminated water enters said interior of each of said pair of contact columns via said lower fluid flow directional elbow which is oriented in close proximity to the bottom-portion of said contact column.

5. The water purification apparatus as in claim 3 wherein said third contact column further comprises:

a diffuser being coupled to the bottom-portion of the interior space of said third contact column;

said ozone source connected in fluid flow communication with said interior space of said third contact column whereby ozone is introduced into the bottom-portion of said third contact column through said diffuser;

whereby the flow of water exiting said water conduit from said pair of contact columns enters the top-portion of said third column such that the water flow is from the top-portion downward, counter to a stream of ozone bubbles being diffused into the bottom-portion of the column.

6. The water purification apparatus as in claim 3 wherein said means for pressurizing said plurality of contact columns further comprises a plurality of relief lines in fluid flow communication with said plurality of contact columns, said water conduits and off-gas conduit, and relief valve means in fluid communication with said relief lines.

7. The water purification apparatus as in claim 3 further comprising a discharge conduit connected to said third contact column, wherein said control means further comprises an in-line sensing device and a three-way control valve in said discharge conduit and an electrical conduit connecting said in-line sensing device and a three-way control valve.

8. The control means as in claim 7, wherein said in-line sensing device is an Oxidation Reduction Potential meter.

9. The water purification apparatus as in claim 7, wherein as treated water exits the third contact column via the discharge conduit it flows by said control means, and if the water quality of the treated water meets a predetermined set-point, said three-way control valve is positioned so the treated water is discharged from the water purification apparatus.

10. The water purification apparatus as in claim 7, wherein as treated water exits the third contact column via the discharge conduit it flows by said control means, and if the water quality of the treated water does not meet a predetermined set-point, said three-way control valve is positioned so the treated water is recycled through the water purification apparatus.

11. The water purification apparatus as in claim 3, wherein said water purification apparatus further comprises a separator in fluid flow communication with said pair of contact columns and said off-gas conduit.

12. The water purification apparatus as in claim 3, wherein said water purification apparatus is dimensioned to be portable and housed within a cabinet.

13. The water purification apparatus as in claim 3, wherein said water purification apparatus is manufactured using modular components.

* * * * *

UNITED STATES PATENT AND TRADEMARK OFFICE
CERTIFICATE OF CORRECTION

PATENT NO. : 5,785,864
DATED : July 28, 1998
INVENTOR(S) : Alfredo J. Teran, et al.

It is certified that error appears in the above-identified patent and that said Letters Patent is hereby corrected as shown below:

Col. 7, line 36
 replace "passes"
 with --pass--.

Col. 7, line 39
 replace "install"
 with --installed--.

Col. 8, line 19
 replace "this the"
 with --the--.

Col. 9, line 53
 replace "calorimetric"
 with --colorimetric--.

Col. 10, line 44
 replace "steam"
 with --stream--.

Col. 11, line 11
 replace "utilizes"
 with --utilized--.

Col. 13, line 66
 replace "or"
 with --of--.

Col. 14, line 37
 replace "steam"
 with --stream--.

UNITED STATES PATENT AND TRADEMARK OFFICE
CERTIFICATE OF CORRECTION

PATENT NO. : 5,785,864
DATED : July 28, 1998
INVENTOR(S) : Alfredo J. Teran, et al.

It is certified that error appears in the above-identified patent and that said Letters Patent is hereby corrected as shown below:

Col. 15, line 55
  replace "a"
  with --an--.
Col. 16, line 16
  replace "and (first occurrence)"
  with --an--.
Col. 16, line 55
  replace "a"
  with --an--.
Col. 17, line 57
  replace "a"
  with --an--.

Signed and Sealed this

Third Day of November, 1998

Attest:

Attesting Officer

BRUCE LEHMAN

Commissioner of Patents and Trademarks